Figure 7:
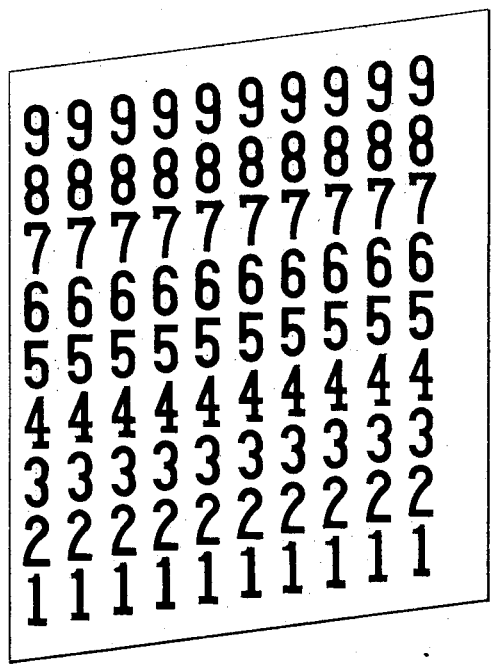

(Model.)
W. H. HORNUM.
FARE REGISTER AND RECORDER.
No. 256,320. Patented Apr. 11, 1882.
5 Sheets—Sheet 1.
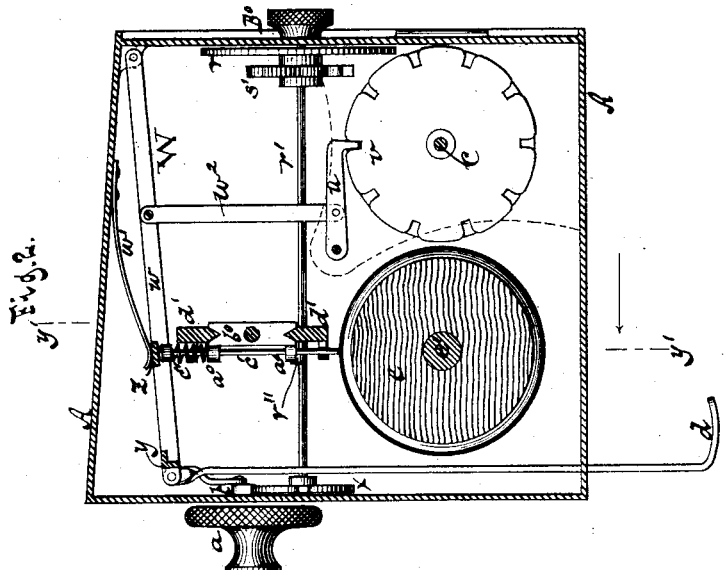
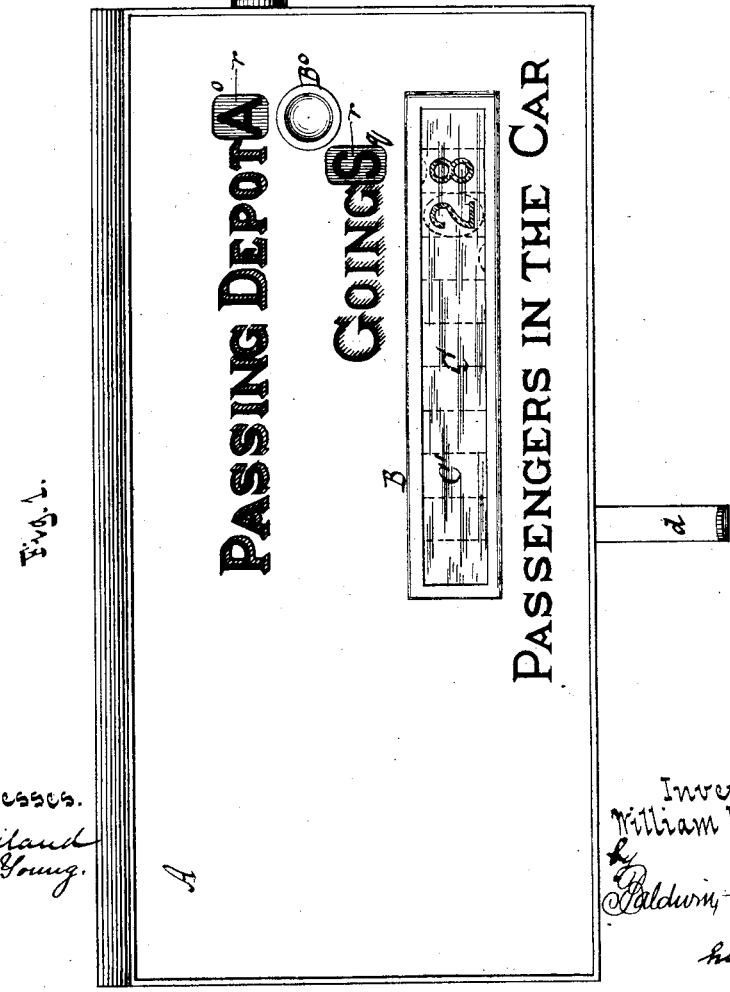
Witnesses.
Otto Hufeland
James Young.
Inventor.
William H. Hornum.
by
Baldwin, Hopkins & Peyton,
his attorneys.

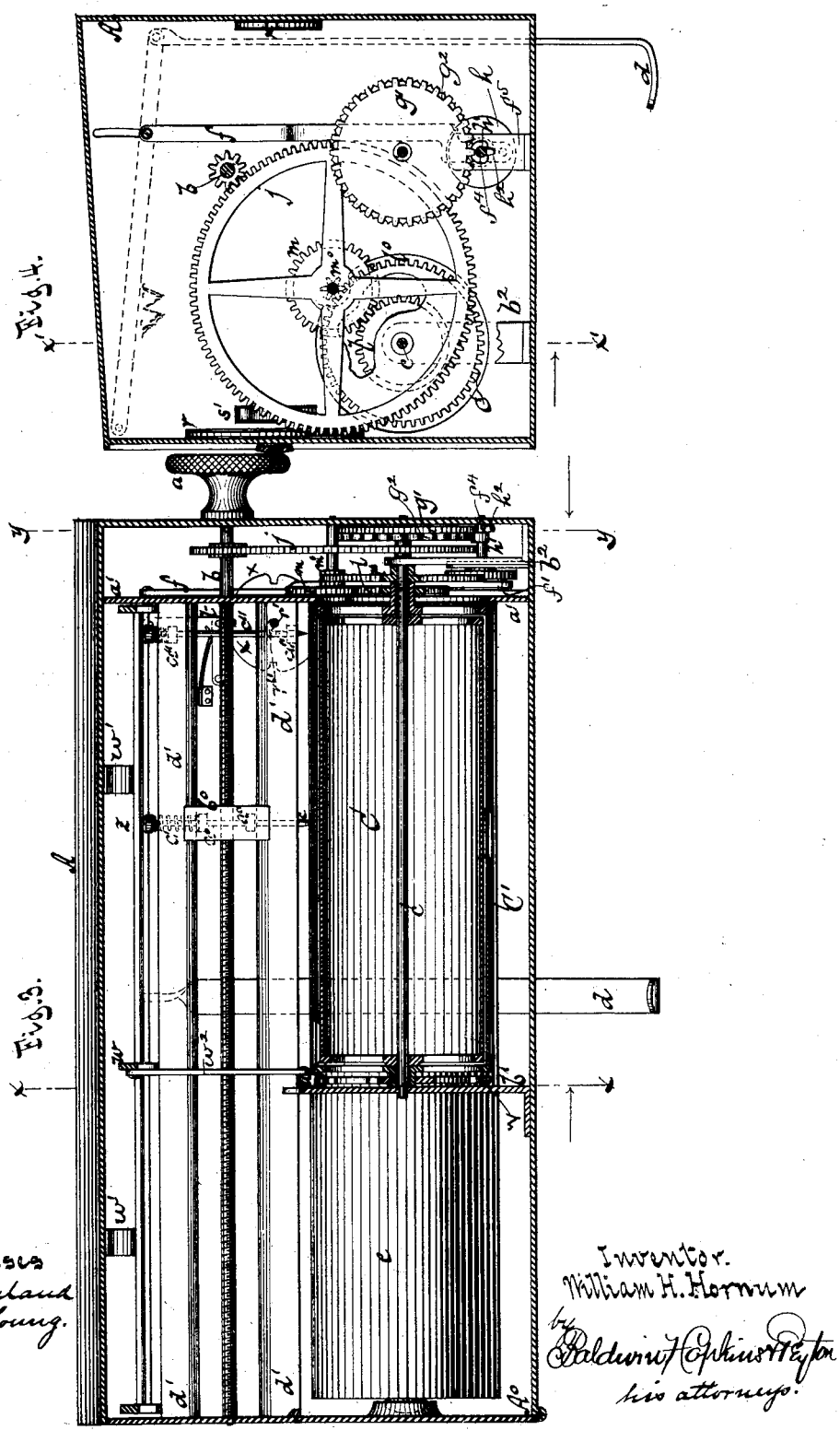

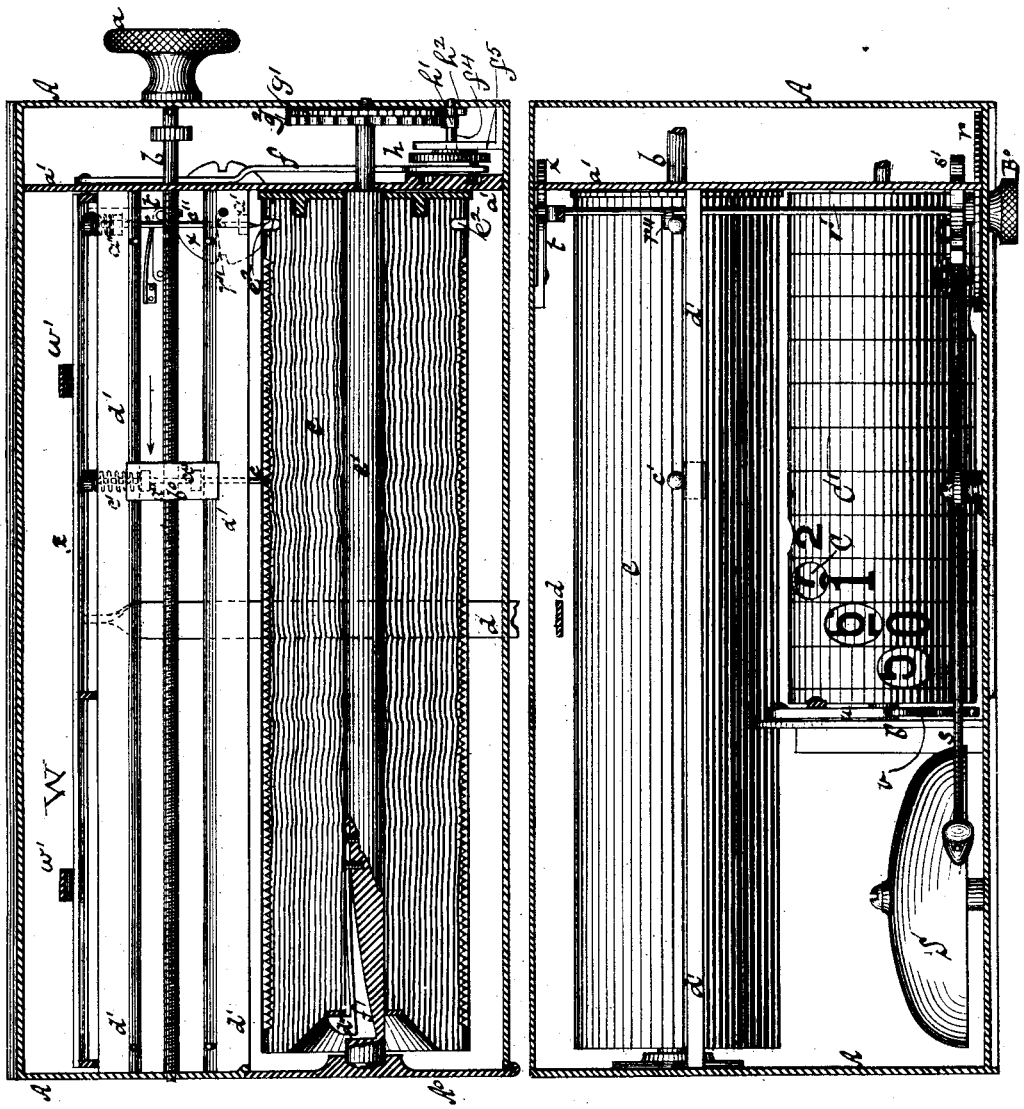

(Model.)

W. H. HORNUM.
FARE REGISTER AND RECORDER.

No. 256,320.　　　　　　　　　　　　Patented Apr. 11, 1882.

Witnesses
Otto Hufeland.
James Young.

Inventor.
William H. Hornum
by Baldwin, Hopkins & Peyton
his attorneys

N. PETERS, Photo-Lithographer, Washington, D. C.

(Model.)

5 Sheets—Sheet 5.

W. H. HORNUM.
FARE REGISTER AND RECORDER.

No. 256,320.

Patented Apr. 11, 1882.

UNITED STATES PATENT OFFICE.

WILLIAM H. HORNUM, OF NEW YORK, ASSIGNOR TO THE RAILWAY REGISTER MANUFACTURING COMPANY, OF BUFFALO, N. Y.

FARE REGISTER AND RECORDER.

SPECIFICATION forming part of Letters Patent No. 256,320, dated April 11, 1882.

Application filed July 23, 1880. (Model.)

*To all whom it may concern:*

Be it known that I, WILLIAM H. HORNUM, of the city, county, and State of New York, have invented certain new and useful Improvements in Fare-Registers, of which the following is a specification.

My invention relates to machines of the class which are operated by the conductor or the collector of the fares on passenger-cars or vehicles to register or tally the number of passengers carried in the conveyance or the fares collected from them, whereby a true account of the fares collected must be rendered to the proper officer of the company to whom the collector is responsible, as the machine constitutes a monitor upon the collector's honesty, and prevents false returns and dishonest appropriations without detection.

The object of my invention is to provide an improved register which is proof against fraudulent manipulations on the part of the conductor or collector; and my said invention consists of certain new combinations of mechanism which are recited at the close of this specification.

The accompanying drawings show a machine embodying my said new combination of mechanism in the best way known to me at the date of filing my application. It will be understood, however, that the machine I am about to describe is but one way of embodying my improvements, some of which improvements may be used without the others and in machines differing somewhat from that hereinafter described in detail. Said machine embodies in its organization the following instrumentalities: First, a passenger-register which the conductor operates to show the number of passengers in the car or vehicle, or fares collected at the time of arriving at some particular station or point on the road or at the terminus of the road; second, a register which records the same number as the passenger-register and constitutes a permanent record thereof in such manner that when the passenger-register is reset or its indication changed said permanent register will preserve a record not only of the number of passengers or fares registered by the passenger-register, but will also distinctly show the number of passengers or fares indicated by said register at each time of resetting, and also the number of times said passenger-register has been so reset or changed; third, a station or direction indicator, the indication of which may be changed or shifted; fourth, mechanism which normally locks the passenger-register from being reset and the direction-indicator from being changed or shifted, and which, when actuated to permit the said register to be reset, also releases the said indicator to permit its indication to be changed; fifth, mechanism to register the number of times said register and indicator locking mechanism has been operated, in order to prevent tampering with the machine without detection; sixth, mechanism to register the number of shifting movements of the station or direction indicator; and, seventh, an alarm apparatus which is sounded each time the station or direction indicator is shifted to show another indication.

Figure 9:
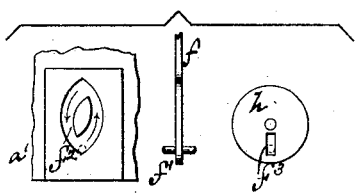
Figure 10:
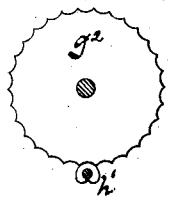
Figure 8:
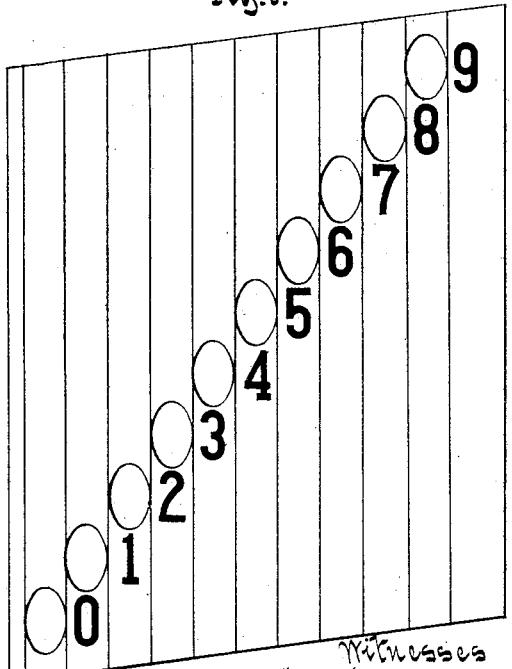
Figure 11:
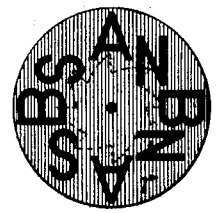
Figure 12:
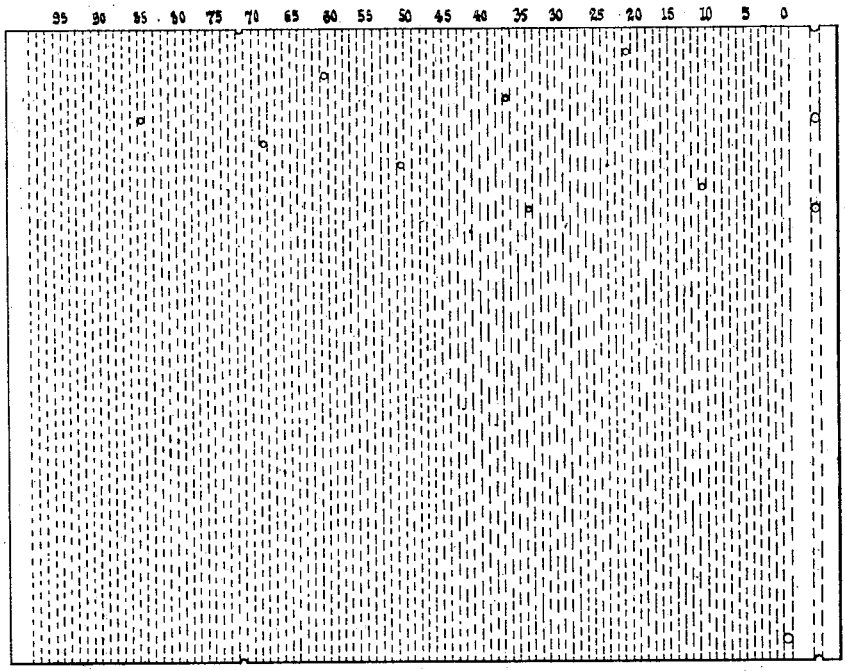

In the drawings, Figure 1 is a front elevation or face view of the improved apparatus, with the passenger-register indicating a record of twenty-eight fares at the time of passing station A, going south. Fig. 2 is a vertical transverse section through said apparatus on the line *x x* of Fig. 3, looking in the direction indicated by the arrow in said last-mentioned figure. Fig. 3 is a longitudinal vertical section through the machine on the line *x' x'* of Fig. 4, looking in the direction indicated by the arrow in said Fig. 4. Fig. 4 is a vertical transverse section through one end of the apparatus on the line *y y* of Fig. 3, looking in the direction indicated by the arrow in said last-mentioned figure. Fig. 5 is a longitudinal vertical section through the machine on the line *y' y'* of Fig. 2, looking in the direction indicated by the arrow in said Fig. 2. Fig. 6 is a plan or top view of some of the internal parts of the mechanism, the top plate of the inclosing-casing and some of the working parts being removed. Fig. 7 is a plan view of the numbered slip covering the inner cylinder of the passenger-register of the type I prefer to employ, and Fig. 8 is a view of the numbered slip covering the outer cylinder of said passenger-register. Figs. 9 and 10 are detached views of some of the parts. Fig. 11 is a face view of the station or direction indicator disk; and Fig. 12 is a view of the recording-slip of the "permanent register," so called by me.

The casing A of the apparatus is preferably of an oblong rectangular shape, as shown in the drawings, Figs. 1 to 6, inclusive, with the top plate inclined downward from the back of the casing to the front face thereof, in order to afford ample room for the operative parts, a casing of such a shape being preferable when the inclosed mechanism is organized as in the present instance.

The front or face plate of the casing is provided with a glass-covered opening or window, B, through which to read or inspect the indications of the temporary passenger or trip register, and also with openings or windows $o$ $q$ to view the indications of the direction or station indicator.

Suitable words or inscriptions on the face-plate of the casing may describe what the indications of the apparatus mean. (See Fig. 1.)

The said passenger-register is organized preferably upon the plan shown and described in my Letters Patent No. 171,133, dated December 14, 1875, reissued September 7, 1880, as No. 9,371, and consists preferably of two numbered cylinders, C C′, arranged one inside the other. The inner cylinder, C, which indicates "tens," is secured upon an axle or shaft, $c$, turning in bearings at one end in the plate $b'$, rising from the base of the casing, and at the other end in a standard, $b^2$, also rising from said base. The outer cylinder, C′, which indicates "units," revolves loosely upon the said axle $c$. A spur or cog wheel, $l^0$, is firmly secured or fixed upon the axle $c$ of the cylinder C, near one end, and said wheel gears or meshes with a small pinion-wheel, $m^0$, fixed upon a shaft mounted in bearings in the partition-plate $a'$ at one end and in the casing at the other. A second but larger pinion or gear wheel, $m$, is fixed upon said shaft, and gears with a cog-wheel, $l$, secured to or fixed upon the journal of the outer cylinder, C′. The proportions between the cog-wheels $l^0$ $l$ and pinion-wheels $m^0$ $m$ is such that when the inner cylinder is turned the outer cylinder will also be turned and caused to move in the same direction, but at a different speed from that of said inner cylinder, the movements of said cylinders, in other words, being differential.

The manner of organizing the cylinders of the register, being fully described in my aforesaid reissue, it is unnecessary to describe them in detail here. Suffice it to say that the outer cylinder registers units and the inner cylinder tens, the register having the capacity of registering ninety-nine passengers or fares, while its record is at all times visible through the window in the face-plate of the casing.

Mounted upon the shaft which carries the pinion-wheels $m^0$ $m$, and fixed securely thereto, is a comparatively large spur-wheel, $j$. This wheel receives its motion, in order to operate the passenger-register, through the medium of a pinion-wheel firmly keyed upon a revolving shaft, $b$, which extends longitudinally through the machine, having its bearings in the end plates of the casing. A suitable thumb-nut, crank, or handle, $a$, is connected to one end of said shaft $b$, outside the casing, to enable the operator to readily turn it in manipulating the register.

The register is normally locked from turning by means of a notched wheel, $v$, keyed or firmly secured to the journal or shaft of the units-cylinder C′ at its end opposite that which has its actuating gear-wheel, a detent-pawl, $u$, pivoted to the supporting-plate $b'$, engaging the notches of said wheel to lock it from turning. In order to release said detent-pawl $u$ from engagement with the notched wheel $v$, so as to permit the passenger-register to be turned by the actuating-handle of the machine, I hinge a frame, W, upon the inside of the casing, at the upper front side, just beneath the top plate, and extend it backward to near the back plate of the casing. (See Figs. 2 and 4.) At or about the middle of the connecting-bar $y$ of said frame, next the back plate of the casing, I hinge or pivot a push-bar or trigger, $d$, which extends down through the bottom of the casing whereby said frame W may be pushed upward by the finger or hand so as to rock the frame upon its hinge, said frame being acted upon by suitable plate-springs, $w'$ $w'$, or otherwise, to force or hold it normally in its lowermost position, as shown in Figs. 2, 3, and 4. A link, $w^2$, connects a cross-bar, $w$, of the frame W with the detent-pawl $u$, and the organization is such that when said frame is in its normal position the pawl $u$ is permitted to engage the notch-wheel $v$, while when said frame is raised or pushed up by the push-bar or trigger $d$ said pawl will be rocked upon its pivot out of engagement with said wheel, thus permitting the register to be freely turned by the operator until the number showing through the window B corresponds with the number of passengers in the conveyance or with the number of fares collected at the time of reaching a certain point, or at the time of arriving at the terminus of the road.

Below the frame W and extending lengthwise of the machine are two parallel guides or bars, $d'$ $d'$, separated from each other and both lying in the same vertical plane. Between these guide-bars $d'$ is fitted a slide, $b^0$, from the back face of which project two arms, $a^0$ $a^0$. In suitable vertical openings in said arms a marker, $c'$, reciprocates. Said marker may be in the form of a pencil, but I prefer to make it in the form of a pricker with a sharp or penetrating point. Said pricker is preferably headed at its upper end, and surrounding said pricker, between said head and the upper arm, $a^0$, of the slide $b^0$, is a spiral spring, $c^2$, the action of which is to throw said pricker upward. Said pricker lies just beneath a longitudinal connecting-bar, Z, of the detent-frame W, and when said frame is in its normal position said pricker is forced downward, while as soon as said frame is raised said pricker, owing to the action of its spring, also rises.

The slide which carries the pricker is moved backward and forward lengthwise of the guides $d'$ $d'$ by means of screw-threads cut upon the actuating-shaft $b$ of the machine, the slide being provided with female threads to receive said screw-shaft. It will be obvious that as the shaft $b$ is turned in one direction the slide will be moved one way along its guides, while a reverse movement will carry the slide in the opposite direction.

It will also be observed that as the shaft is turned to actuate the passenger-register it will also actuate the slide carrying the pricker, the object of which will presently appear.

Immediately beneath the marker or pricker $c'$ is mounted a circumferentially-grooved roller, $e$, which extends lengthwise of the machine, the shaft $e'$ of the roller, which passes entirely through it, having its bearings at one end in the partition-plate $a'$ and in the end plate of the casing, and at the other end in a step or recess formed in or fitted to a hinged door, $A^0$. Surrounding said roller $e$ is a numbered recording-slip, preferably like that shown in Fig. 12, so that when laid upon and wrapped around or secured to the said roller repetitions of the same figures lie circumferentially, while the numbers in their consecutive order, 1, 2, 3, &c., run along in the direction of the longitudinal axis of said roller.

The recording-slip is for the purpose of permanently recording the same number as the passenger-register (when operated) is made to show to indicate the amount of fares collected or passengers in the vehicle at the time of arriving at some definite point in the line of travel, or at the terminus of the road; also, to show the number indicated by the passenger-register at each time of resetting; and, also, to show the exact number of resetting movements of said register.

The operation is as follows: The detent mechanism which locks the passenger-register is raised by the operator. The handle or knob $a$ of the shaft $b$ is then turned until the passenger-register indicates through the window a correct tally or count of the fares received or passengers in the car. The movement of the pricker-slide has likewise been effected, and its organization is such that it moves to indicate upon the permanent recording-slip the same number as is tallied by the passenger-register. The detent-frame is then allowed to descend under the action of its springs, and, owing to its bar Z, forces down the pricker, which punctures a hole in or makes a mark upon the recording-slip to constitute a permanent record of the tallies of the passenger-register. Upon the arrival at the next station or point on the road, where a new indication is to be made upon the passenger-register, the detent mechanism is again raised and the register reset or made to indicate the desired number. This number is likewise recorded on the recording-slip, as before described, whereby it will be obvious that not only is the entire number registered by the passenger-register recorded upon said slip, but the number of resetting movements of said register also; and, what is very important, a distinct record is made of the number shown by said register prior to each resetting operation thereof. The operation of raising and lowering the detent-frame W also partially turns the roller $e$ to prevent mixing of the marks upon the recording-slip, and this is accomplished by pivoting to the detent-frame the upper end of a link or arm, $f$, the lower end of which carries a pin, $f'$, one end of which works in a cam-groove, $f^2$, in the partition-plate $a'$, or a plate attached thereto, and the other in a radial slot, $f^3$, in a wheel, $h$, mounted upon the end of a turning-shaft, $f^4$, having its bearings in the supporting-plate $f^5$ at one end and in the end plate of the casing at the other. (See Figs. 3, 4, 5, and 9.) Said turning-shaft $f^4$ is provided with an actuating-tooth, $h^2$, and with a heart-shaped cam, $h'$. Said tooth and cam are arranged to engage respectively a tooth-wheel, $g'$, and a fluted wheel, $g^2$, formed as one wheel preferably, said wheels being firmly keyed upon the shaft $e'$ of the recording-roller $e$. (See Figs. 3, 4, 5, and 6.)

The cam-groove $f^2$ is of the shape clearly shown in Fig. 9, and its function in a device substantially the same as that now described is fully set forth in Letters Patent No. 171,132, granted to me December 14, 1875. Suffice it here to say that said cam-groove compels a full up-and-down movement of the trigger or push-bar which operates the detent-frame W, and causes the revolution of the wheel $h$ and its shaft. At each revolution of said shaft the tooth $h^2$ engages the wheel $g'$, turning it and the roller $e$ the distance of one tooth, while the cam $h'$ engages the fluted edge of the wheel $g^2$ for the purpose of preventing the accidental rotation of said roller by the jolting of the vehicle or similar causes. When the wheel $h$ is rotated said cam $h'$ helps to turn the roller; but when at rest, in the position shown in Fig. 10, said cam acts as a detent to hold said roller stationary. The wheel $g'$ $g^2$ serves the additional purpose of an index to show the number of times the trigger or push-bar $d$ has been raised and lowered, which is important, in order to disclose any efforts which may have been made to tamper with the machine.

It has been stated that the shaft $e'$ passes entirely through the roller $e$, which carries the recording-slip, and that it has its bearings at one end in the partition $a'$ and end plate of the casing, and at the other in a recess or box carried by a hinged door, $A^0$. The object of this construction is that the said door, when unlocked and opened, will be swung away from the shaft, so as to permit the roller to be slipped off endwise therefrom. The roller is held upon the shaft during the operation of the machine by means of a spring detent or catch, $d^*$, lying in a longitudinal recess in the shaft, the detent engaging a suitable groove or shoulder in the roller, as clearly shown in Fig. 5. When the door A is opened the catch $d^*$ is depressed or released and the roller removed, so that the recording-slip, with its indications, may be taken off to constitute a permanent record, a new slip being placed upon the roller to receive subsequent records and the roller replaced upon its shaft.

In connection with the passenger-register and permanent register hereinbefore described I employ a direction or station indicator and an alarm apparatus which can only be operated when the said registers are in a state to be moved to change their indicators. Said direction-indicator consists preferably of a circular disk, $r$, (shown as detached in Fig. 11,) which has on its face suitable letters or marks to indicate one or more stations on the road, and also the direction of travel, which, either by themselves or in connection with the inscriptions or words on the face of the register, clearly enable the indications to be understood. In Fig. 1 the station indicated is depot "A" and the direction of travel south, while the number of passengers in the car, or the fares collected at the time of passing depot "A" going south, is twenty-eight. The indicator in the example shown has two stations marked upon it—that is "A" and "B"—while the direction of travel north or south in passing either station will be indicated, the machine shown in the present example being organized for use upon a road running in directions north and south. Said indicator $r$ is mounted next the face-plate of the casing, upon one end of a turning-shaft, $r'$, running crosswise of the machine, whereby the indicator may be readily turned or shifted to display the proper indication. Said shaft has its bearings in the front and back plates of the casing, and is provided at its front end, outside the casing, with a suitable knob or handle, $B^0$, by which to turn it. At the rear end of said shaft is firmly keyed a notched wheel, $x$, with which a detent-pawl, $t$, pivoted to the casing, engages to normally lock the said wheel and shaft from turning. Said pawl, by a link-connection with the detent-frame W, is raised at the same time that the detent-pawl which normally locks the passenger-register is raised or disengaged, and thus permits the indicator to be shifted when the register is reset, while it will be locked when said register is locked.

In order to register the number of shifting or changing movements of the direction-indicator, I make use of a second pricker or marker, $c^2$, to act upon the recording-slip of the roller $e$, which roller has a somewhat deep circumferential groove, $e^2$, just beneath the pricker-point covered by the said slip. This pricker is headed and moved up and down in vertical openings in arms $a'$ $a'$, projecting from the guide-rods $d'$ $d'$, being normally held up out of contact with the recording-slip by a spiral spring coiled about it between one of said arms $a'$ and its head. Upon turning the shaft $r'$ to shift the indicator a lug or wiper, $r^2$, comes in contact with a pin or surface projecting from the pricker and forces it downward, making a mark or indentation in the recording-slip, and thus registering the setting or shifting movements of the indicator. Each subsequent movement of the indicator will also be recorded on the slip.

Upon the turning-shaft $r'$, by which the indicator is shifted, just back of said indicator, is mounted and firmly keyed a toothed wheel, $s'$, and with the teeth of this wheel the rear end of the pivoted bell-hammer arm $s$ engages, said end being held in contact with said wheel by a spring, as is common in registering apparatus. The rotation of the shaft in shifting the indicator turns the wheel $s'$ and operates the alarm, the hammer being raised against the tension of its impelling-spring by each tooth, and as the tooth passes away from the said arm and permits it to descend the alarm is sounded by the sudden contact of the hammer with the bell S.

From what has been said it is believed the nature and objects and the subject-matter of my invention will be fully understood. Hence further elaboration is unnecessary.

I claim as my invention—

1. The combination, substantially as hereinbefore set forth, of the passenger-register, the actuating gearing and handle of said register, the notched wheel of said register, the detent-pawl to engage said wheel to lock it, and the trigger or push-bar, independent of the actuating-handle of the register, to release said detent to permit the register to be moved.

2. The combination, substantially as hereinbefore set forth, of the passenger-register, the actuating-handle of said register, the permanent register-roller carrying a recording-slip to be marked or punctured, the marking device moved by the actuating-handle of the passenger-register over said recording-slip simultaneously with the operation of the passenger-register, and the device acting upon said marker to cause it to mark or puncture the recording-slip to make a record of the indications of the passenger-register.

3. The combination, substantially as hereinbefore set forth, of the passenger-register, the permanent register-roller covered with its recording-slip extending lengthwise of the machine, the turning-shaft to actuate said passenger-register, and the marking device moved by said shaft along the roller to make an impression upon the recording-slip.

4. The combination, substantially as hereinbefore set forth, of a roller provided with a recording-slip, mechanism, substantially as described, operated by hand to impart a partial or step-by-step rotation to said roller, and a marker traveling lengthwise of said roller to make a mark upon said slip.

5. The combination, substantially as hereinbefore set forth, of the permanent register-roller, the shaft of said roller from which the roller may be readily removed, and bearings for said shaft, one of which is attached to a removable part of the inclosing-case, and capable of separation from said shaft to permit the roller to be removed endwise therefrom.

6. The combination, substantially as hereinbefore set forth, of the permanent register-roller, its shaft, and a locking-connection between the roller and shaft to secure the two together in operation while permitting of their ready separation when required.

7. The combination, substantially as hereinbefore set forth, of the permanent register-roller, the shaft of said roller having bearings at its opposite ends, the locking-connection between said roller and shaft, and the hinged door carrying one of the bearings of said shaft, whereby when said door is opened the bearing carried by it is swung away from the shaft and access afforded to the locking-connection, so that it may be disengaged and the roller removed from the machine.

8. The combination, substantially as hereinbefore set forth, of the passenger-register, its actuating-handle, the detent mechanism to normally lock said register from operation, the trigger to operate the detent mechanism to release the register, and a registering device independent of the passenger-register to indicate the number of times said trigger is operated.

9. The combination, substantially as hereinbefore set forth, of the direction-indicator, its shaft, the actuating-handle of said shaft, and the marker actuated by said shaft to register the shifting or changing movements of said indicator.

10. The combination, substantially as hereinbefore set forth, of a passenger-register, a direction-indicator, and detent mechanism, substantially as described, for normally locking and simultaneously releasing said register and said indicator.

11. The combination, substantially as hereinbefore set forth, of a passenger-register, a direction-indicator, an alarm apparatus, and mechanism, substantially as described, for normally locking said register, indicator, and alarm apparatus, and for releasing them, whereby the indicator can only be shifted or changed and the alarm sounded when the register is free to be moved to make a count or tally.

12. The combination, substantially as hereinbefore set forth, with a passenger-register and mechanism, substantially as described, for indicating the resetting movements of said register, of a direction-indicator and mechanism, substantially as described, for indicating the shifting movements of said indicator.

13. The combination, substantially as hereinbefore set forth, of a passenger-register, an actuating-handle therefor, mechanism, substantially as described, to record the resetting or changing movements of said register, a direction-indicator, the operating mechanism of said indicator, mechanism, substantially as described, to record the shifting movements of said indicator, and devices to normally lock said register and said indicator.

14. The combination, substantially as hereinbefore set forth, of a temporary passenger-register, a permanent register, an actuator to actuate said registers, mechanism, substantially as described, to normally lock said registers from being moved, and mechanism, substantially as described, to register the movements of said locking mechanism, which release the registers and enable them to be operated to change their indications.

15. The combination, substantially as hereinbefore set forth, of a temporary passenger-register, a permanent register, an actuator to actuate said registers, a direction-indicator and its actuating device, and mechanism, substantially as described, to normally lock said registers and indicator, so that when operated to release the registers said mechanism also releases the indicator to permit it to be shifted.

16. The combination, substantially as hereinbefore set forth, of the passenger-register, the permanent register, the actuating-handle of said registers, the direction-indicator and its actuating device, the alarm apparatus, and mechanism, substantially as described, which normally locks said registers, indicator, and alarm from operation, while when released it permits the registers to be moved, the indicator to be shifted, and the alarm to be sounded.

In testimony whereof I have hereunto set my hand and seal in the presence of two subscribing witnesses.

WILLIAM H. HORNUM. [L. S.]

Witnesses:
W. C. HAUFF,
E. F. KASTENHUBER.